Jan. 5, 1932.  A. J. LEWIS  1,839,400
CHUCK
Filed July 11, 1928  2 Sheets-Sheet 1
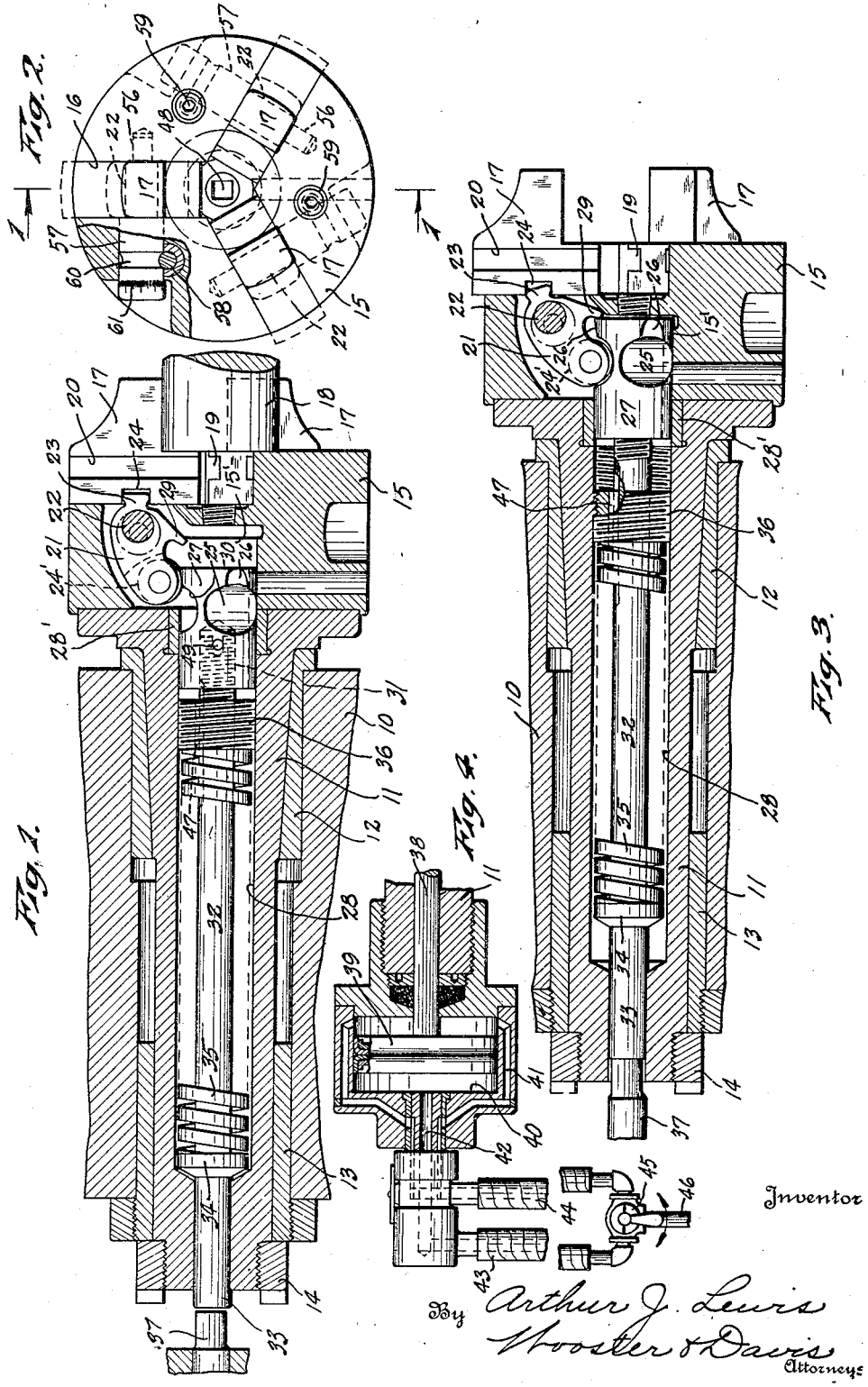

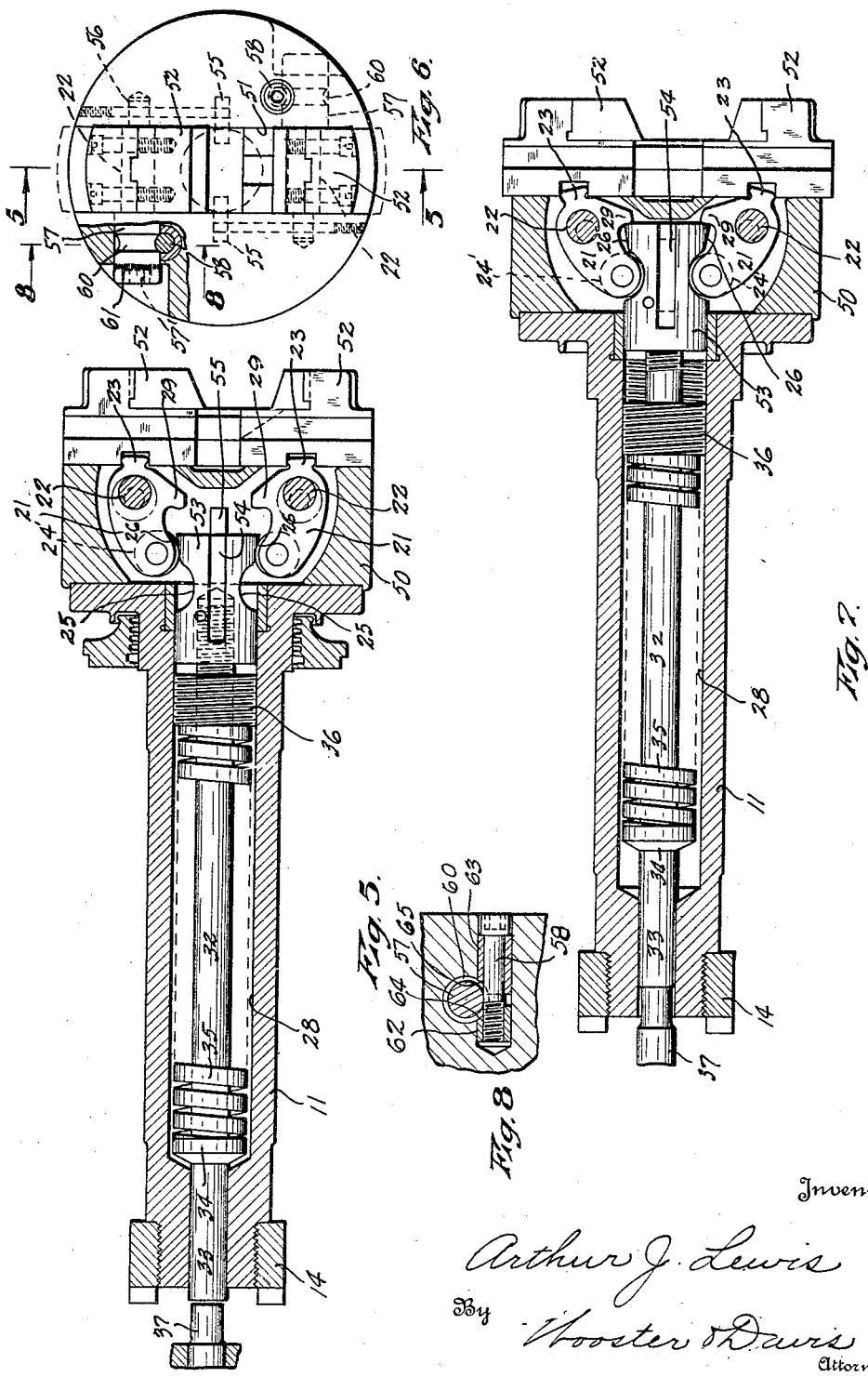

Patented Jan. 5, 1932

1,839,400

UNITED STATES PATENT OFFICE

ARTHUR J. LEWIS, OF STRATFORD, CONNECTICUT, ASSIGNOR TO THE BAIRD MACHINE COMPANY, OF STRATFORD, CONNECTICUT, A CORPORATION OF CONNECTICUT

CHUCK

Application filed July 11, 1928. Serial No. 291,867.

This invention relates to chucks, particularly to a chuck which may be operated automatically, although it is not limited to such operation, and has for an object to provide a chuck which may be used in a multiple spindle chucking machine of the type illustrated in my Patent No. 1,689,440, issued Oct. 30, 1928, but it is equally adapted for use on a single spindle machine.

It is also an object of the invention to provide a chuck in which the jaws are operated by the cam movement which is so arranged as to secure a great clamping effect of the jaws.

It is another object to provide an operating cam arrangement for the jaws in which the preliminary movement of the jaws toward the work is a very rapid one with a relatively small movement of the operating device while the final clamping movement will be affected by a relatively greater movement of the cam with a smaller movement of the jaws to secure a large clamping force.

It is another object of the invention to provide a chuck construction in which the jaws are moved positively in both directions, and in which the operating cams are so arranged that the jaws will not be spread by outward pressure thereon.

With the foregoing and other objects in view, the invention consists in certain novel features of construction, combinations and arrangements of parts as will be more fully described in connection with the accompanying drawings. In these drawings, Fig. 1 is a longitudinal section of the chuck substantially on line 1—1 of Fig. 2 and showing the jaws closed onto a piece of work, this being a three-jaw chuck.

Fig. 2 is a front elevation of the chuck looking from the right of Fig. 1 and with a portion of the head broken away to more clearly show the construction.

Fig. 3 is a section similar to Fig. 1 showing the jaws open.

Fig. 4 is a detail section showing how the jaws may be operated by the use of compressed air.

Fig. 5 is a longitudinal section through the chuck involving my invention showing a two-jaw chuck, the section being substantially on line 5—5 of Fig. 6 and the jaws being shown in the closed position.

Fig. 6 is an end elevation looking from the right of Fig. 5 with a portion of the head broken away to more clearly show the construction.

Fig. 7 is a view similar to Fig. 5 showing the jaws in open position, and

Fig. 8 is a detail section of the mounting for the jaw operating levers.

The chuck as illustrated is applied to a rotatable turret 10 of a multiple spindle chucking machine in which several turning operations are performed at one time such as described and claimed in my prior patent previously noted. It will be understood that in these machines the turret is indexed automatically between consecutive cycles of operation, but this indexing mechanism is not shown as it forms no part of the present invention. The chuck spindle is shown at 11 mounted in suitable bearings 12 and 13 in the turret and the spindle is driven by any suitable drive as a clutch mechanism, one element of which is shown at 14. At its opposite end the spindle carries a head 15 which has radial guideways 16 for the jaws 17, the jaws being guided for lateral movement toward and from the piece of work indicated at 18. The guideways usually have guide ribs 19 extending into similar shaped grooves 20 in the sides of the jaws to retain these jaws in the head and permit their lateral sliding movement. The jaws, as shown in Fig. 2, are equally spaced and as there are three of them they are one hundred and twenty degrees apart. Pivoted in the head to the rear of the jaws are jaw operating levers 21, one for each jaw, and they are mounted on eccentrically mounted pins 22 on which they turn as pivots. At their forward ends they each have a head 23 projecting into a recess 24 in the wall of the jaw for operating the jaw. At the opposite side of the pivots 22 these levers are each provided with a roller 24' cooperating with cam surfaces 25 and 26 on a movable cam element 27. This element in the construction shown is a plug mounted to reciprocate in a central longitudinal opening 28 in the spindle, and the cam surfaces 25 and 26 are adjacent so that as the member 27 is reciprocated they operate in succession on the roller 24'. It will also be noted that the cam surfaces 25 and 26 are of different pitches so that it requires different amounts of movements for the cam element to give the same movement to the jaws 17 when the roller engages the surfaces. The surface 25 is at the greatest pitch to the axis of the spindle, and therefore, a smaller movement of the cam will give a greater movement to the jaw than would the same movement when the roller is on the surface 26. The surfaces are, therefore, so arranged that the roller 24' is on the surface 25 at the latter part of the movement of the jaw away from the work and the first part of the movement of the jaw toward the work to give a rapid movement of the jaw in this position, while the surface 26 of the smaller pitch is engaged by the roller at the end of the clamping movement to clamp the jaws against the work. These surfaces, therefore, give the large clamping force required to hold the work and they are at such an angle that a small holding force on the cam 27 will prevent the jaws separating. Each operating lever 21 also has an inwardly extending projection 29 which is engaged by the inner end 30 of the cam element 27 when this member is operated to open the jaws. Co-operation of the end of this member with the extension 29, as indicated in Fig. 3, will give a positive movement to force the jaws to open position.

In Figs. 1 and 3 the cam element 27 is connected by a suitable means, such as a thread 31 to a rod 32 in the center of the spindle, which rod is reciprocable in the spindle and projects at 33 from the rear end of the spindle. On the rod is a collar 34 against which one end of a spring 35 engages. The opposite end of this spring engages a plug 36 threaded into the spindle. The spring 35, therefore, tends to shift the rod 32 to the left, as viewed in Figs. 1 and 3, and carry with it the cam element 27. This spring, therefore, tends to shift the jaws 17 to closed position and clamp them on the work 18. The jaws may be opened and the work released by pressing inwardly or to the right on the rod 32. Means for automatically doing this is shown at 37 and the operation of this element is described in my copending application above mentioned.

Different means may be employed, as shown in Fig. 4. In this arrangement the rod 38 corresponding to the rod 32 in Figs. 1 and 3 is operated by a piston 39 mounted to reciprocate in a cylinder 40. In the walls of the piston are air conducting passages 41 and 42 leading to opposite sides of the piston with an air pipe 43 leading to the passage 42 and an air pipe 44 leading to the passages 41. These passages are controlled by a valve 45 in a supply pipe 46 from any suitable source of air pressure. It will be obvious that by operating the valve 45 the piston 39 may be reciprocated and the jaws 17 of the chuck opened and closed.

The threaded plug 36 carries a key 47 which may slide in a keyway in the rod 32 and the cam element 27 may have a non-circular socket 48 (Fig. 2) to receive a suitable tool for rotating the cam element and its rod 32 and through it the plug 36 to adjust the tension of the spring 35. The cam element 27 may be pinned to the rod 32, as shown at 49, to prevent the cam element rotating on the rod.

In Figs. 5, 6 and 7, I have shown my invention as applied to a two-jaw chuck. In this construction the head 50 has a transverse slot or guideway 51 in its front wall for the two jaws 52. The jaws are, therefore, diametrically opposite jaws on opposite sides of the axis of the spindle. In the three jaw arrangement of Figs. 1, 2 and 3 the jaws are self centering that is the work is self centered by these jaws, and the cam block or element 27 is guided in the opening 28 and the bushing 28' and also by the walls 15' in the head between the guideways for the jaws. In the two-jaw arrangement, however, they are not necessarily self centering, and therefore, additional guiding means is provided for the cam element 53. This element has longitudinal grooves 54 at its opposite sides to receive keys 55 mounted in the head on the opposite sides of the guideway 51 to thus maintain this cam element central in the head and insure uniform operation to the two jaws 52.

In both arrangements the jaw operating levers 21 are mounted on eccentric pivot pins 22 in the head, these pins having bearings 56 and 57 in the head which are eccentric to the bearings 22 in the levers. Transverse pins 58 are rotatable as by means of a suitable tool inserted in non-circular sockets 59 in their outer ends and as these pins each extend transversely in the annular groove 60 in its pivot pin 22 it holds this pivot pin in the head and permits its rotation by means of a suitable tool inserted in the non-circular socket 57' in one end thereof. Thus as the central bearing for the lever is eccentric its position may be adjusted to adjust the relative positions of the jaws 17 and 52. The head of this pin may be provided with a suitable scale 61 cooperating with a suitable mark on the head 15 or 50 to indicate the amount of adjustment. The pin 58 is threaded at its inner end into a sleeve 62, as shown in Fig. 8, and its body portion extends through another sleeve 63 which engages under the head of pin 58 at its outer end. These sleeves are spaced from each other and are cut away at their opposed ends, as shown at 64 and 65 respectively. Thus by turning pin 58 these sleeves are clamped on opposite sides onto the pivot pin 57 and hold it in adjusted positions. By turning this pin 57 the head or lug 23 on the jaw operating lever 21 may be withdrawn from the socket 24 in the jaw, thus permitting the jaw to be slid laterally outwardly and removed from the head.

From the foregoing description it will be apparent that I have produced a chuck of relatively simple construction which may be normally held in closed position by a spring 35 or air pressure if preferred, and it may be quickly released by any suitable means operating the shifting rod 32 or 38 so that the work may be quickly secured in the chuck or as quickly released, and when once in the chuck is very securely clamped therein as the cam surfaces 26 are at a relatively small angle to the axis of the spindle, and therefore, give a great clamping action with a relatively small force acting on the cam. This small angle to the cam also renders it practically non-reversible so that no locking means is required for the jaws, as a very small holding force on the cam will prevent opening of the jaws.

Having thus set forth the nature of my invention, what I claim is:

1. In a chuck, a head, a jaw mounted for radial reciprocable movement in the head, a lever connected to the jaw for operating it, a pivoting stud for said lever having a bearing in the head, an eccentric bearing for said stud sufficiently offset from the first bearing so that when the stud is in one position the lever is in engagement with the jaw and when in the diametrically opposite position the lever is out of engagement with the jaw, whereby the lever may be shifted to adjust the jaw or to disconnect the lever from the jaw to permit removal of the jaw from the head, and means for locking said bearing against movement comprising an annular groove about said bearing, a pin passing through said groove, a pair of sleeves on said pin on either side of the said bearing and means on said pin for clamping said sleeves about said bearing.

2. In a machine of the class described, a rotatable turret, a rotatable work spindle in said turret, a chuck carried by said spindle including a head, a plurality of radially movable jaws carried by said head, means for operating said jaws to engage and disengage the work, comprising a slidable rod extending longitudinally in the spindle, an operative connection from the rod to the jaws, a spring for operating the rod to close the jaws on the work, and means to engage the rod to shift it to open the jaws, said latter means being located entirely outside the spindle when the jaws are closed to permit free movement of the spindle with the turret.

3. In a machine of the class described, a rotatable turret, a rotatable work spindle in said turret having a longitudinal passage therein, a chuck on the outer end of the spindle comprising a head and a plurality of radially movable jaws carried by said head, a longitudinally slidable rod in said passage having its inner end accessible from the inner end of the spindle, operative means between the rod and the jaws to shift the jaws, a spring tending to shift the rod to close the jaws to work clamping position, and operating means to engage the inner end of the rod to shift the jaws to release the work, said latter means being located entirely outside the spindle when the jaws are closed to permit free movement of the spindle with the turret.

4. In a machine of the class described, a rotatable turret, a rotatable work spindle in said turret, means carried by said spindle adapted to cooperate with a driving means outside the turret for rotating the spindle, a chuck carried by said spindle including a head, a plurality of radially movable jaws carried by said head, means for operating said jaws to engage and disengage the work comprising a slidable rod extending longitudinally in the spindle, an operative connection from the rod to the jaws, said spindle being provided with an enlarged longitudinal opening about the rod, a spring in said opening so as to be enclosed by the spindle and embracing the rod, means for connecting the spring to the rod for operating the rod to close the jaws on the work, and means to engage the rod to shift it to open the jaws, said latter means being located entirely outside the spindle when the jaws are closed to permit free movement of the spindle with the turret.

5. In a machine of the class described, a rotatable turret, a rotatable work spindle in said turret having a longitudinal passage therein, a chuck on the outer end of the spindle comprising a head and a plurality of radially movable jaws carried by said head, a longitudinally slidable rod in said passage having its inner end accessible for operation from the inner end of the spindle, an operative element connected to the rod, means operated by said element for shifting the jaws, a spring embracing the rod in said passage and connected to the rod at one end so as to tend to shift it to move the jaws to work clamping position, a plug in the spindle between the spring and the operative element forming an abutment means for the other end of the spring and mounted to be adjusted longitudinally of the rod to adjust the tension of the spring, and operating means to engage the inner end of the rod to shift the rod to release the work.

6. In a machine of the character described, a rotatable turret, a work spindle carried by said turret having a longitudinal passage therein, a chuck carried by the spindle comprising a head, a plurality of jaws mounted for radial movement in the head, an operating rod mounted for longitudinal sliding movement in said passage, a cam element connected to said rod for sliding movement therewith, said cam element having inclined surfaces, levers pivoted in the head and connected to the jaws, rollers on the levers adapted to engage said cam surfaces to operate the jaws to work clamping position, a spring in the passage connected to the rod to shift it to clamp the jaws on the work, a shoulder on the cam element outwardly of the cam surfaces, an extension on each lever projecting into the path of said shoulder to shift the jaws to open position when the rod is operated against the action of the spring, and means normally outside the spindle for shifting the rod to open the jaws.

In testimony whereof I affix my signature.

ARTHUR J. LEWIS.